3,311,485
MICA PIGMENTS
Ernest J. Duwell, St. Paul, Minn., assignor to Minnesota Mining & Manufacturing Company, a corporation of Delaware
No Drawing. Filed Oct. 28, 1963, Ser. No. 319,501
5 Claims. (Cl. 106—291)

This invention relates to pigments made from synthetic tetrasilicic fluorine mica platelets and basic organic dyestuffs.

In this invention, synthetic tetrasilicic fluorine mica platelets are contacted with sufficient quantities of basic organic dyestuffs, usually in a liquid medium (aqueous or organic) to yield a product in which there are up to about 2.5 milliequivalents of basic dyestuffs associated by ion exchange with each gram of synthetic tetrasilicic fluorine mica. The dyed mica pigment is collected and dried and the resulting product is a colored, finely divided pulverulent solid suitable for use as a pigment in paints, plastics and in other materials to which the addition of pigments is desirable such as paper.

The pigments of the invention possess several distinctive advantages and are of a new and novel type not heretofore available. Owing to the fact that they are made from synthetic tetrasilicic fluorine mica, the individual particles are extremely thin and have a laminar structure not possessed, so far as is known, by any other colored pigments. Thus, although metallic pigments are known having a flaky structure, no other colored pigments possess this structure which is especially useful in enhancing hiding power. Pigments colored by interference colors of microscopic coatings are noted below. When suspended in a suitable vehicle and brushed out the pigments of the invention are found to lie one over the other in random overlapping fashion thereby protecting the underlying materials while still providing decorative colors and absorption of actinic radiation. Micaceous pigments heretofore known were primarily either low cost bulky fillers or extenders of substantially no hiding power or were made by the mechanical adhesion of known pigments to mica leaflets and then possessed only the intrinsic hiding power of the adhered pigments diluted by the mica flakes employed. The concentration of pigment particles was further severely limited by the relatively greater thickness of the laminae of mica available. The reflectivity of mica, is of course, well known, for example, in aventurescence.

The pigments of the invention possess the intense colors of the basic dyestuffs employed in chemically bound form and therefore possess the full fastness to light of the dyestuffs employed and including in greater or less amount a pearly luster. When incorporated in paints the characteristics of the pigments as to color, pearlescence and excellent hiding power are retained; and weathering properties, in exterior paints, are those of the vehicle and base. Accordingly these are truly pigments and not mere extenders. They are especially valuable in interior paints because they make available a wide range of colors of intense hue and tint not otherwise available and further provide a pearly luster. They also make coloring agents available for use in paints in particulate form, which were formerly available only in soluble form and therefore subject to bleeding.

Broadly the pigments of the invention are valuable for their stability, opacity, excellent hiding power, good flatting action, resistance to bacterial and fungal attack, pearlescence, reflectivity and abrasion resistance.

The synthetic tetrasilicic fluorine mica platelets employed in making the pigments of the invention are made according to the disclosure of Hatch, U.S. Patent No. 3,001,571. These may be employed as the sodium form, i.e. having replaceable sodium cations in the crystal lattice, or the sodium form may first be converted to another form having other exchangeable cations in the lattice, such as hydrogen, lithium or barium ions. In general, larger ions are less desirably present but are not inoperative. The term synthetic tetrasilicic fluorine mica will be understood herein to comprise all the forms having exchangeable cations in the lattice.

As stated above, the pigments of the invention are prepared by contacting synthetic tetrasilicic fluorine mica platelets with basic organic dyestuffs, usually in liquid media. Contacting may be effected by first dispersing the synthetic tetrasilicic fluorine mica platelets in a liquid vehicle and then adding a solution of the basic organic dyestuffs in the same or a miscible liquid to the suspension of mica platelets. It is thus possible to use aqueous or alcoholic dispersions of any desirable or convenient concentration of synthetic tetrasilicic fluorine mica platelets.

It is also possible to add the solid mica platelets to a solution of the dyestuffs with some agitation until substantially all the color is removed by the mica platelets leaving a clear supernatant liquid.

The exact amount of basic organic dyestuff employed in any given instance, of course, is determined by factors such as the particular intensity of color desired in the final pigment, the degree of basicity of the dyestuff, e.g. number and nature of the basic groups in the molecule, and the character and amount of the mica platelets employed, so that no exact relationship can or need be specified between the amounts of basic organic dyestuffs and of synthetic tetrasilicic fluorine mica platelets. Practically it is found that the pigments usually contain up to about 15 to 25 percent by weight of dyestuff but the content may be higher. The concentrations of dyestuff employed in the starting solution will be determined by the solubility and considerations of relative manipulative ease of dilute or more concentrated slurries of the pigments formed. The pigment may be recovered from the slurry by conventional methods including filtration, centrifugation, decantation and spray drying. Dyestuffs which are insoluble under certain conditions may be brought into a soluble form in any known method as by formation of a salt with an acid. In such instances the pigment will contain the salt of the acid and it may be desirable to remove it by elutriation, trituration or other operations.

It is generally preferable to make pigments of the deepest shade possible and effect lightening or dilution of color by incoporation of suitable whiteners which term will be understood to include uncolored synthetic tetrasilicic fluorine mica platelets and other colorless, i.e. white, pigments. The addition of a fresh portion of uncolored synthetic tetrasilicic fluorine mica to a batch to bring to a standard color depth is contemplated within the invention. This sometimes assists in making flocs which are more easily manipulated.

In the pigments of the invention up to about one gram equivalent of the dyestuff may combine with about 1 pound of the mica platelets or even slightly less, e.g. about 375 g. of malachite green in 1 pound of mica. Practically, concentrations of the order of 15 to 25 weight percent of dyestuff in the pigment are easily obtained so that very high intensities of coloration are readily achieved. That combination of basic dyestuffs with synthetic tetrasilicic fluorine micas could occur to such extent is considered rather surprising in view of the relatively large size of the dyestuff molecules.

Usually combination of basic organic dyestuff with synthetic tetrasilicic fluorine mica platelets is effected in aqueous or alcoholic media, but any organic liquid which is non-reactive towards the mica and is a solvent for the dyestuff can be employed, such as methanol, acetone, acetonitrile, and the like, normally in conjunction with water.

Without wishing to be bound by theory, it appears that cations of the basic organic dyestuffs are admitted into the cation exchange sites of the crystal lattice of the synthetic tetrasilicic fluorine mica platelets in chemically bound form by replacement of the metallic cations or hydrogen ions previously present. The dyestuffs thus effectively occupies positions in the crystal lattice and is an integral part of the pigment. Thus, for example, when the oxalate salt of malachite green is added to an aqueous slurry of the sodium form of synthetic tetrasilicic fluorine mica platelets there is an almost immediate coloration of the formerly white mica platelets and a concurrent removal of the green colored dye from the aqueous solution. Sodium oxalate remains in solution. The crystal and physical structure of the mica is retained and the green color is firmly bound in the laminar pigment particles. The extent to which basic dyestuff molecules enter into and saturate the crystal lattice of the mica is a function largely of the quantity of dyestuff available. Under any condition at least a portion of the cation exchange sites are occupied by dyestuff molecules.

Because of the manner in which dyestuffs enter into the structure of the pigments, the pigments of the invention are notably distinct from the pigments made by coating mica platelets with colored oxides or the colors of which are the result of interference colors. The latter types of pigments are described in U.S. Patents 3,087,827; 3,087,828 and 3,087,829.

The retention of the basic dyestuffs in the pigment is excellent. Suspension in water results in very little loss of color to the aqueous phase and likewise treatment with solvents or with dilute acids or bases or with dilute solutions of polyvalent cations scarcely discharges the color from the pigment. At high concentrations polyvalent cations cause same discharge of the color. The colors of some dyestuffs are, of course, altered by high concentrations of acid or base. There is only slight removal of color by vehicles such as linseed oil, tung oil, alkyd resins, etc.

The pigments of the invention possess the crystal lattice structure of the synthetic tetrasilicic fluorine mica as can be shown by Laue diagrams and as is evident from the gross microscopically observable morphology of the particles. The particles are different from the original platelets however in being flocked. The flocking by basic dyestuffs is decidedly advantageous in the production of pigments since it greatly facilitates collection of the pigment by filtration as well as subsequent manipulation. The flocks are, however, not granules and readily disperse when the pigments are milled into paints to give pigments having the very small dimensions of the platelets. The particle size of the pigments of the invention is thus very small which is particularly desirable for pigments. For example, Prussian blue is known to enhance hiding power even in substinctorial amounts because of its very small particle size.

The term "basic dyestuffs" is employed herein to refer those dyes which form Bronstead bases. Such dyestuffs are often available as the chlorides or hydrochlorides which metathesize with the synthetic tetrasilicic fluorine mica to form sodium chloride and the pigments of the invention. Any basic dyestuffs are suitable for use in the processes and products of this invention. Examples of specific classes of basic dyestuffs include monoazo, disazo, trisazo and the like, azoic dyes, diphenyl and triphenylmethane dyes, xanthenes, acridines, quinoline dyes, methines, thiazole dyes, indamines, azines, oxazines and thiazines.

Because the basic nature of the dyestuff alone is critical to the invention, it is not necessary to describe these classes of dyestuffs in great detail. It is well known to the art which dyestuffs have these characteristics. Representative dyestuffs of these classes are shown to form pigments of the invention hereinafter. In general it is preferred that the basic dyestuffs employed be free from acidic functional groups such as sulfonic and carboxylic acid groups which lead to zwitterions. They may contain among other non-interfering groups, alkyl, fluoroalkyl, halo, hydroxyl, alkoxy ester and nitro groups and will normally include at least one basic amino group unless the basicity is ascribable to an oxonium group. There is no limit to the range of colors obtainable in the pigments of the invention inasmuch as all colors are available in basic dyestuffs. If desired, two or more colors may be combined in one pigment using appropriate basic dyestuffs in total amount less than the saturation amount. Alternatively, two or more pigments of the invention may be milled or mixed together to give intermediate shades, hues or tones.

Now, having described the invention in broad general terms it is more specifically illustrated by examples showing the best mode presently contemplated of practicing the invention. In these examples parts are by weight and percentages of solutions are in weight per volume.

*Example 1*

In each of six vessels are placed 5 gr. of synthetic tetrasilicic fluorine mica platelets (air dry) and 50 ml. of 0.5 weight percent ethanolic solution of the following dyestuffs is added to the respective vessels. After agitation for about 15 minutes, during which time much of the color is removed from solution, the excess solution is decanted and the resulting colored platelets are washed by decantation and dried at 25° C. at atmospheric pressure. Lumps which may form are broken up by any desired method. It will be evident that if desired, the colored mica pigments can also be separated by filtration and that the precise time of agitation is not critical.

TABLE 1

| Dyestuff | Color Index No. | Color of resultant pigment |
| --- | --- | --- |
| Fuchsin ABP | 42510 | Dusky Rose. |
| Pigment Yellow 18 | 49005 | Bright Yellow. |
| Astrafloxine FF | 48070 | Bright Rose. |
| Basic Green 4 | 42000 | Blue Green. |
| Auramine O | 41005 | Bright Yellow. |
| Para Rosaniline | 42500 | Dusky Rose. |

*Example 2*

Fluorescent dyes dissolved in excess ethanol are contacted with synthetic tetrasilicic fluorine mica as in Example 1 above using 10 grams of the mica with 50 ml. of 0.5 percent alcoholic solution of the indicated basic dyestuffs. The pigments are separated from the alcoholic slurry by filtration and washing with additional alcohol followed by air drying.

TABLE 2

| Fluorescent dye: | Color of resulting pigment and product |
| --- | --- |
| Azo Sol Brilliant Yellow 8GF | Yellow |
| Azo Sol Brilliant Yellow 6G | Yellow |
| Rhodamine G | Red |

Example 3

This example illustrates pigments of the invention formed employing basic dyestuffs of various categories. When 500 ml. portions of an aqueous suspension of synthetic tetrasilicic fluorine mica (2% concentration) are mixed with 50 ml. of 0.5 percent solutions of the basic dyestuffs indicated in the table below (all as the chlorides or hydrochlorides) and the suspension stirred for about five minutes and filtered, pigments having the colors indicated are obtained.

TABLE 3

| Dyestuff | Color Index Number | Type of Dyestuff | Pigment Color |
| --- | --- | --- | --- |
| Phenosaframine | 11045 | Monoazo and azine | Greenish blue. |
| Disazotized 4-methoxy-m-phenylene diamine coupled with m-phenylene diamine. | 21030 | Disazo | Dull reddish brown. |
| Janus Brown R | 33500 | Trisazo | Brown. |
| Solvent Yellow 34 | 41000B | Diphenyl methane | Bright greenish yellow. |
| Malachite green | 42000B | Triaryl methane | Bluish green. |
| Acridine Red 3B | 45000 | Xanthene | Red. |
| Acriflavine | 46000 | Acridine | Yellow. |
| Flavaniline | 47025 | Quinoline | Do. |
| Indolenine yellow | 48010 | Methine | Do. |
| Phenylene blue | 49400 | Indamine | Greenish blue. |
| Flavinduline | 50000 | Azine | Orange yellow. |
| Capri blue | 51000 | Oxazine | Blue. |
| Lauth's violet | 52000 | Thiazine | Violet. |

Other basic dyestuffs are employed in the preparation of pigments by the same procedure. When the relative amounts of dyestuffs are decreased somewhat lighter shades of pigment are obtained. When higher relative amounts of dyestuff are employed, darker shades of pigment are obtained up to the saturation shade for the particular dyestuff.

Example 4

Three suspensions each of 25 g. of synthetic tetrasilicic fluorine mica platelets in about 1 liter of water are converted to pigments employing respectively 5 g. each of methyl violet, basic fuchsin and malachite green. Each dyestuff is dissolved in about 2 liters of water and the solution is then added to the suspension of mica platelets gradually with stirring. At the end of the addition some of each color remains in solution in the supernatant liquid and the flocked pigment is collected and twice washed by resuspension in water. The second wash removes very little color. Portions of each pigment are washed in ethanol which is found to remove color progressively over several washes and is less satisfactory because some of the dyestuff is thus lost and inorganic salts may be retained. The solid pigments after washing are dried at 140° F. for about 16 hours.

Portions of the above pigments are assayed for organic content. The samples are first dried at 100° C. for 24 hours and are then equilibrated to atmospheric moisture for 2 days (about 72° F. and 34% relative humidity) to determine moisture content. The samples are then ignited to a white ash and loss of weight determined. The results of these assays are shown in Table 4.

TABLE 4

| Dyestuff | Wash method | Percent water takeup | Percent loss on ignition |
| --- | --- | --- | --- |
| Malachite green | EtOH | 4.27 | 19.6 |
| Methyl violet | EtOH | 5.24 | 19.3 |
| Do | HOH | 4.11 | 14.1 |
| Basic fuchsin | EtOH | 3.92 | 23.7 |
| Do | HOH | 4.05 | 18.3 |

Portions of the above pigments are milled with linseed oil to provide oil base colors for use in paints or in oil painting. The oil ground pigments are intensely colored with the color of the corresponding dyestuff, viz. green, violet and purple. When incorporated in white oil base paint they are found to enhance the hiding power and also to have good tinctorial properties.

Portions of the above pigments are dispersed in concentrtaions of 1, 5 and 10 percent by weight in a 20 percent by weight solid acrylic lacquer comprising (for example, the acrylic resin Acryloid B82 available commercially from the Rohm & Haase Co.) in solvents such as methylethyl and ethyl butyl ketone and provide useful lacquers of differing intensities of color. When incorporated together with whiteners, e.g. uncolored tetrasilicic fluorine mica, titania or magnesia, lacquers having lighter shades of color are obtained. Lacquers containing these pigments are coated on paper and there is found to be no bleeding through to the back. Lacquers prepared using only the dyestuff in comparable concentrations are found to bleed through the paper. Lacquers employing the pigments of the invention are therefore more economical of the dyestuffs for surface coloring of paper. The pigments may also be employed in making safety paper which shows erasures.

What is claimed is:

1. A colored laminar pigment consisting essentially of crystalline structure of synthetic tetrasilicic fluorine mica having cations of basic organic dyestuffs admitted into the crystalline structure in at least a portion of the cation exchange sites thereof.

2. A colored laminar pigment according to claim 1 wherein a water-soluble basic organic dyestuff is rendered substantially unleachable by water from the sites occupied by cations of the said dyestuff in the crystalline structure.

3. A process for the formation of colored laminar pigments wherein combination of colloidally dispersed synthetic tetrasilicic fluorine mica and cations of basic organic dyestuffs by admission of said cations to the cation exchange sites in the crystalline structure of said mica is effected in aqueous milieu.

4. A process for the formation of colored laminar pigments comprising the steps of interreacting an aqueous colloidal dispersion of synthetic tetrasilicic fluorine mica with a basic organic dyestuff selected from the group consisting of monoazo, disazo, trisazo, diphenylmethane, triarylmethane, xanthene, acridine, quinoline, methine, thiazole, indamine, azine, oxazine and thiazine dyestuffs whereby cations of said dyestuff are admitted into the cation exchange sites of the crystalline structure of said mica and the said colloidal dispersion is flocculated and thereafter collecting the precipitated mica containing cations of the said basic organic dyestuff.

5. A colored laminar pigment according to claim 1 containing from about 15 to about 25 percent by weight of organic dyestuff in the structure thereof.

References Cited by the Examiner

UNITED STATES PATENTS

| | | | |
|---|---|---|---|
| 2,149,979 | 3/1939 | Pace | 8—8 |
| 2,332,220 | 10/1943 | Harshberger | 117—100 |
| 2,865,426 | 12/1958 | Heyman | 161—171 |
| 2,935,481 | 5/1960 | Hochwalt | 117—100 |
| 3,001,571 | 9/1961 | Hatch | 106—39 |
| 3,079,209 | 2/1963 | Boggus | 106—291 |
| 3,087,828 | 4/1963 | Linton | 106—291 |

TOBIAS E. LEVOW, *Primary Examiner.*

S. E. MOTT, *Assistant Examiner.*